United States Patent
Sarh et al.

(10) Patent No.: US 6,357,101 B1
(45) Date of Patent: Mar. 19, 2002

(54) METHOD FOR INSTALLING FASTENERS IN A WORKPIECE

(75) Inventors: Branko Sarh, Huntington Beach; Trent Logan, Foothill Ranch; David Stanley, Los Alamitos, all of CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/522,222

(22) Filed: Mar. 9, 2000

(51) Int. Cl.$^7$ ............................................... B23Q 17/00
(52) U.S. Cl. .................. 29/407.09; 29/407.1; 29/524.1; 29/34 B; 29/709; 29/715; 29/719; 403/13; 403/16; 403/76
(58) Field of Search .......................... 29/407.01, 407.05, 29/407.09, 407.1, 524.1, 509, 525.05, 525.06, 26 A, 34 B, 703, 705, 709, 714, 715, 719, 720, 243.53, 271, 275, 798; 408/13, 16, 76, 1 R

(56) References Cited

U.S. PATENT DOCUMENTS

| | | | |
|---|---|---|---|
| 3,796,506 A | | 3/1974 | Buck |
| 4,604,006 A | * | 8/1986 | Shoji et al. .................... 408/76 |
| 4,854,491 A | | 8/1989 | Stoewer |
| 4,858,289 A | * | 8/1989 | Speller, Sr. ................. 29/34 B |
| 4,862,043 A | | 8/1989 | Zieve |
| 4,908,928 A | * | 3/1990 | Mazurik et al. ............... 29/509 |
| 4,990,805 A | | 2/1991 | Zieve |
| 5,390,732 A | | 2/1995 | Bathla |
| 5,535,498 A | * | 7/1996 | Roberts et al. .......... 29/407.05 |
| 5,555,616 A | | 9/1996 | Michalewski et al. |
| 5,621,963 A | | 4/1997 | Givler |
| 5,685,058 A | | 11/1997 | Givler |
| 5,774,968 A | | 7/1998 | Givler |
| 6,011,482 A | | 1/2000 | Banks et al. |
| 6,073,326 A | | 6/2000 | Banks et al. |
| 6,088,897 A | | 7/2000 | Banks et al. |
| 6,134,940 A | | 10/2000 | Banks et al. |
| 6,158,666 A | | 12/2000 | Banks et al. |
| 6,172,374 B1 | | 1/2001 | Banks et al. |
| 6,210,084 B1 | | 4/2001 | Banks et al. |

* cited by examiner

Primary Examiner—David P. Bryant
Assistant Examiner—Jermie E. Cozart
(74) Attorney, Agent, or Firm—Alston & Bird LLP

(57) ABSTRACT

An apparatus for installing rivets or other fasteners through a workpiece includes an automated machine disposed on one side of the workpiece and a hand-held tool that is manipulated by a single worker located on the opposite side of the workpiece. The automated machine includes an end effector supporting tools such as a drill and a riveter. The automated machine also includes a guide structure adapted to be releasably affixed to the workpiece, and a carriage that travels along the guide structure and supports the end effector so that the end effector can be positioned in various locations along the surface of the workpiece where fasteners are to be installed. The end effector includes an electromagnetic clamping device, and the hand-held tool includes a magnetic clamping block that is attracted by the clamping device to clamp the workpiece therebetween. The end effector generates a positioning signal and the hand-held tool includes a detector for detecting the positioning signal. The detector is operable to generate guidance information telling the person operating the hand-held tool where to move the hand-held tool so as to align the tool with the end effector of the automated machine. Once the hand-held tool is aligned with the end effector, the electromagnetic clamping device is activated to clamp the workpiece, and then the end effector tools are operated to drill a hole and to install a rivet or other fastener into the hole.

10 Claims, 7 Drawing Sheets

2-D MAGNETIC FIELD PLOT

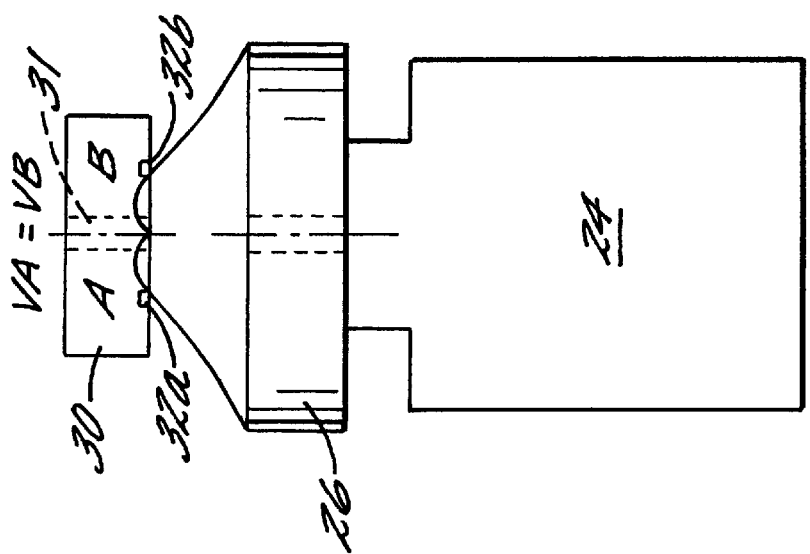
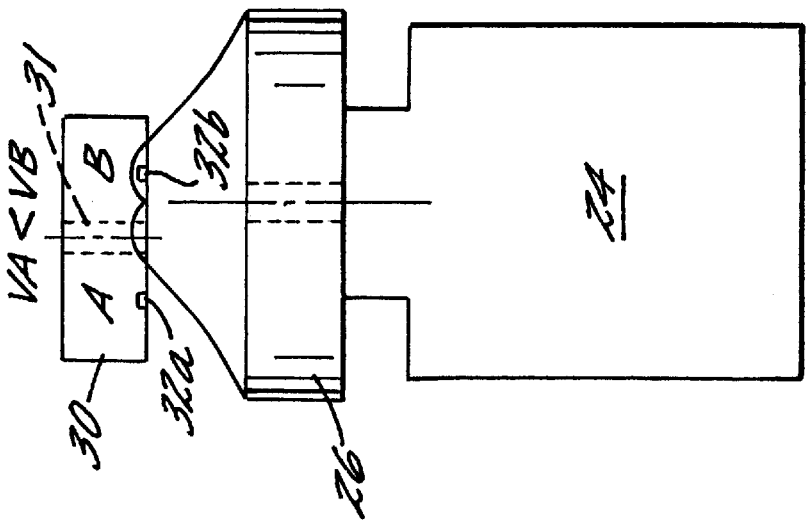
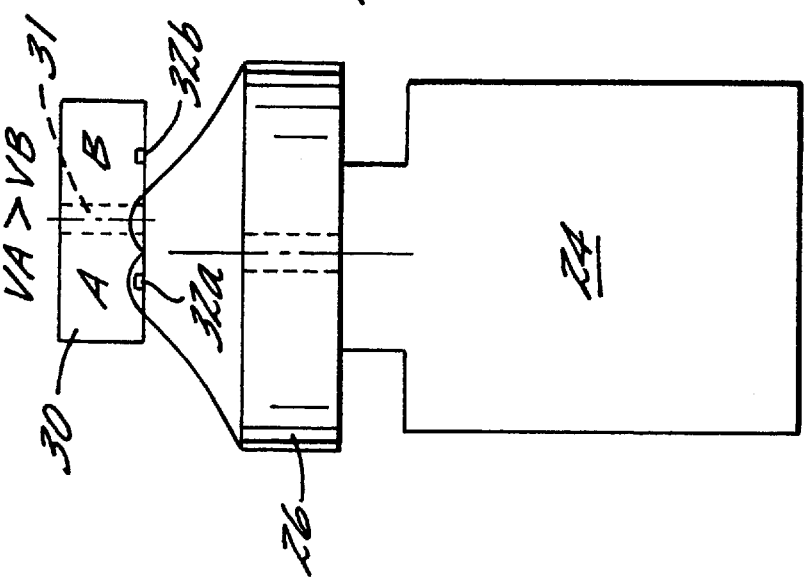

METHOD FOR INSTALLING FASTENERS IN A WORKPIECE

FIELD OF THE INVENTION

The invention relates to devices and methods for installing rivets or other fasteners through workpieces such as wing skins, fuselage skins, or the like. The invention more particularly relates to automated devices and methods for drilling holes through a workpiece and installing fasteners into the holes.

BACKGROUND OF THE INVENTION

Installation of rivets or other types of fasteners in large airframe structures such as wing skins, fuselage skins, and the like, is typically performed either manually or by large computer-controlled machines. The manual process involves two workers disposed on opposite sides of the workpiece to be fastened. The workers install clamping devices, for example by drilling holes through the workpiece and installing temporary fasteners and/or clekos into the holes, so as to clamp together the parts to be joined. Next, a hole is drilled through the workpiece with a hand-held drill, a rivet is installed into the hole, and the two workers use an impact hammer on one side of the workpiece and an anvil on the other side to upset the rivet.

The manual process is time consuming and expensive, but has been necessary in situations where an automated machine cannot access the workpiece. For example, in fuselage barrels, it has not been possible to install rivets with existing automated machines, because there is no way for the machine to simultaneously access both sides of a fuselage skin. Most automated machines employ some version of a C-frame device, in which the workpiece to be operated upon must be capable of being disposed between the two opposing jaws of the C-frame. The C-frame jaws support tooling such as drills and riveters. A riveter generally requires two cooperative tooling elements, one located on one of the jaws of the C-frame and the other located on the other jaw, so that the two tooling elements can be disposed on opposite sides of a workpiece. A C-frame riveter may also include cooperative clamping elements for clamping the workpiece between the jaws. For small structures, where the distance from an edge of the structure to the location at which a rivet is to be installed is less than the length of the jaws, a C-frame riveter can be used. However, for areas that cannot be accessed by the jaws of a C-frame riveter, such as inside wings and fuselage barrels, an alternative approach is needed. Preferably, the alternative approach should use automation at least to some extent, so that the time and expense of installing rivets can be reduced relative to manual riveting.

SUMMARY OF THE INVENTION

The above needs are met and other advantages are achieved by the present invention, which provides an apparatus for installing rivets or other fasteners through a workpiece combining an automated machine disposed on one side of the workpiece and a hand-held tool that is manipulated by a single worker located on the opposite side of the workpiece. The automated machine includes an end effector supporting tools such as a drill for drilling a hole through a workpiece, and a riveter for installing a rivet into the hole. The automated machine also includes a guide structure, such as a pair of guide rails, adapted to be releasably affixed to or adjacent to the workpiece, and a carriage that travels along the guide structure and supports the end effector so that the end effector can be positioned in a desired location along the surface of the workpiece where a fastener is to be installed. The end effector includes an electromagnetic clamping device that generates a magnetic field. The end effector also includes a positioning device that generates a positioning signal detectable on the opposite side of the workpiece.

The hand-held tool includes a magnetic clamping block, such as a steel block or the like. When the magnetic clamping block is placed against the opposite surface of the workpiece on the side opposite from the end effector, the magnetic field of the clamping device will cause the clamping block to be attracted toward the clamping device, thus clamping the workpiece therebetween. The hand-held tool includes a detector for detecting the positioning signal of the positioning device. The detector is operable to generate guidance information telling the person operating the hand-held tool where to move the hand-held tool so as to align the tool with the end effector of the automated machine. The hand-held tool may include a visual display, such as a liquid crystal display or light-emitting diode display, for displaying the guidance information in graphical or other form. Once the hand-held tool is aligned with the end effector, the electromagnetic clamping device is activated to clamp the workpiece, and then the end effector tools are operated to drill a hole and to install a rivet or other fastener into the hole.

Preferably, the hand-held tool includes a command signal generator operable to generate a command signal, and the end effector is operable to receive the command signal and to activate the electromagnetic clamping device upon receipt of the command signal. Thus, for example, once the hand-held tool is aligned with the end effector, the operator may pull a trigger or operate some other switch device on the hand-held tool so as to generate the command signal telling the end effector to begin the clamping and other operations.

In accordance with a preferred embodiment of the invention, the positioning device on the end effector comprises the electromagnetic clamping device itself. Advantageously, the clamping device can generate a relatively weak magnetic field for positioning purposes, enabling the detector on the hand-held tool to detect this field and generate the guidance information telling the worker how to align the tool with the end effector. The detector may comprise, for instance, a magnetic compass or similar type of sensor. Once the tool is aligned, the worker activates the command signal generator. The end effector receives the command signal, which causes the current supplied to the electromagnetic clamping device to be increased for clamping the workpiece.

Where the end effector includes a riveter for installing a rivet into the hole drilled by the automated machine, the hand-held tool advantageously is operable to facilitate upsetting the rivet, for example through passive bucking (i.e., anvil upsetting). Alternatively, the end effector may be operable to install another type of fastener, for example a lock bolt or the like, that does not require cooperation by the hand-held tool, in which case the hand-held tool performs primarily a clamping function in cooperation with the automated machine.

After completion of the installation of a fastener, the end effector advantageously is operable to signal the worker that the operation is completed. The worker may then deactivate the hand-held tool, for example by releasing a trigger or the like, so that the hand-held tool in turn causes the electromagnetic clamping device to be deactivated. The clamping force is thus removed, and the automated machine can be moved to a new location for a subsequent fastener installation to be performed. Alternatively, the end effector may automatically deactivate the electromagnetic clamping device once installation of the fastener is complete, so that no action of the worker is required to release the clamping force on the workpiece.

The invention thus enables fasteners to be installed in workpieces in situations where a C-frame machine or the like would not be usable, and at the same time avoids the need for two workers as required with the conventional manual process. The apparatus and method of the invention also enable improved accuracy in fastener location and installation relative to the manual process. The method of fastener installation in accordance with the invention is also faster than the conventional manual process.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIGS. 8A through 8C are schematic representations of the hand-held tool in three different positions relative to the end effector and electromagnet with the spatial distribution of magnetic flux superimposed to show the relative flux strengths at the sensors in those three positions;

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
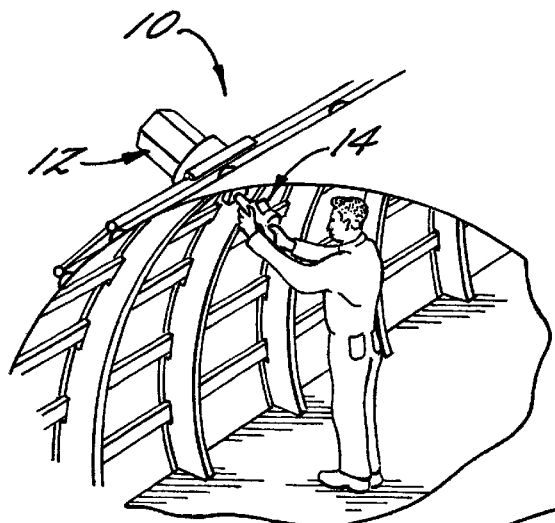
FIG. 1 is a schematic perspective view of an apparatus in accordance with a preferred embodiment of the invention in use in a fuselage barrel.
Figure 2:
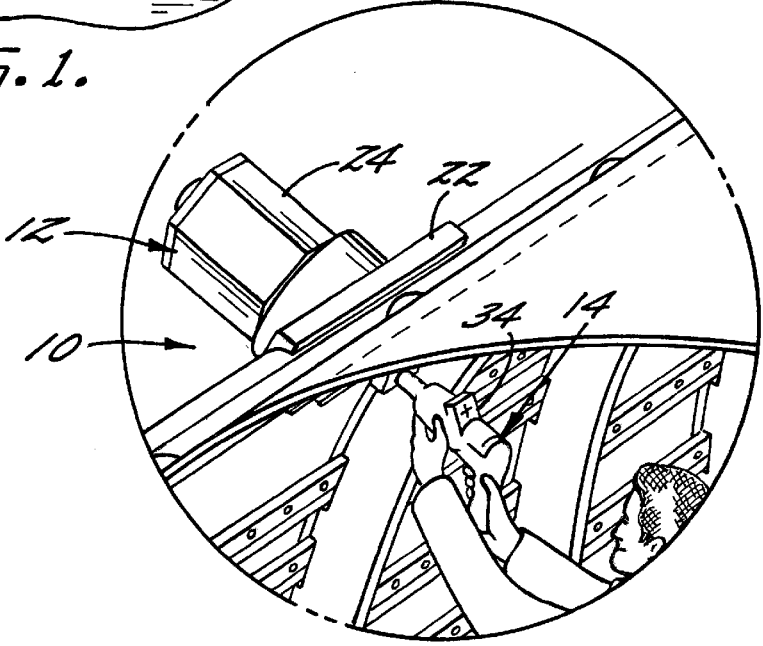
FIG. 2 is an enlarged view of a portion of FIG. 1, showing the apparatus in greater detail.
Figure 3:
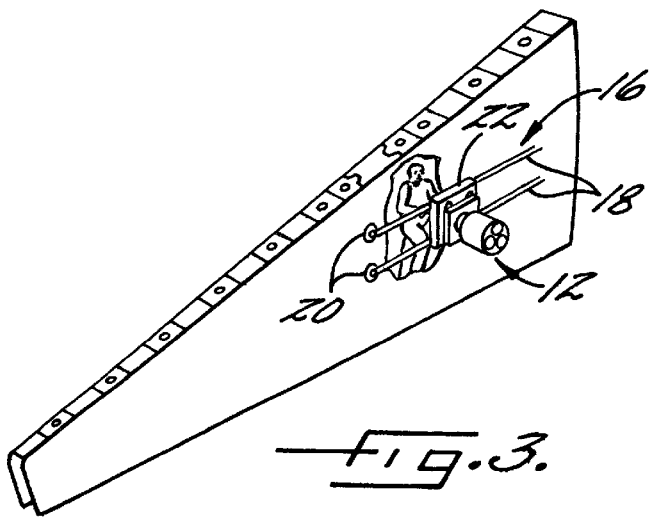
FIG. 3 is a schematic perspective view of the apparatus in use on a wing box.
Figure 4:
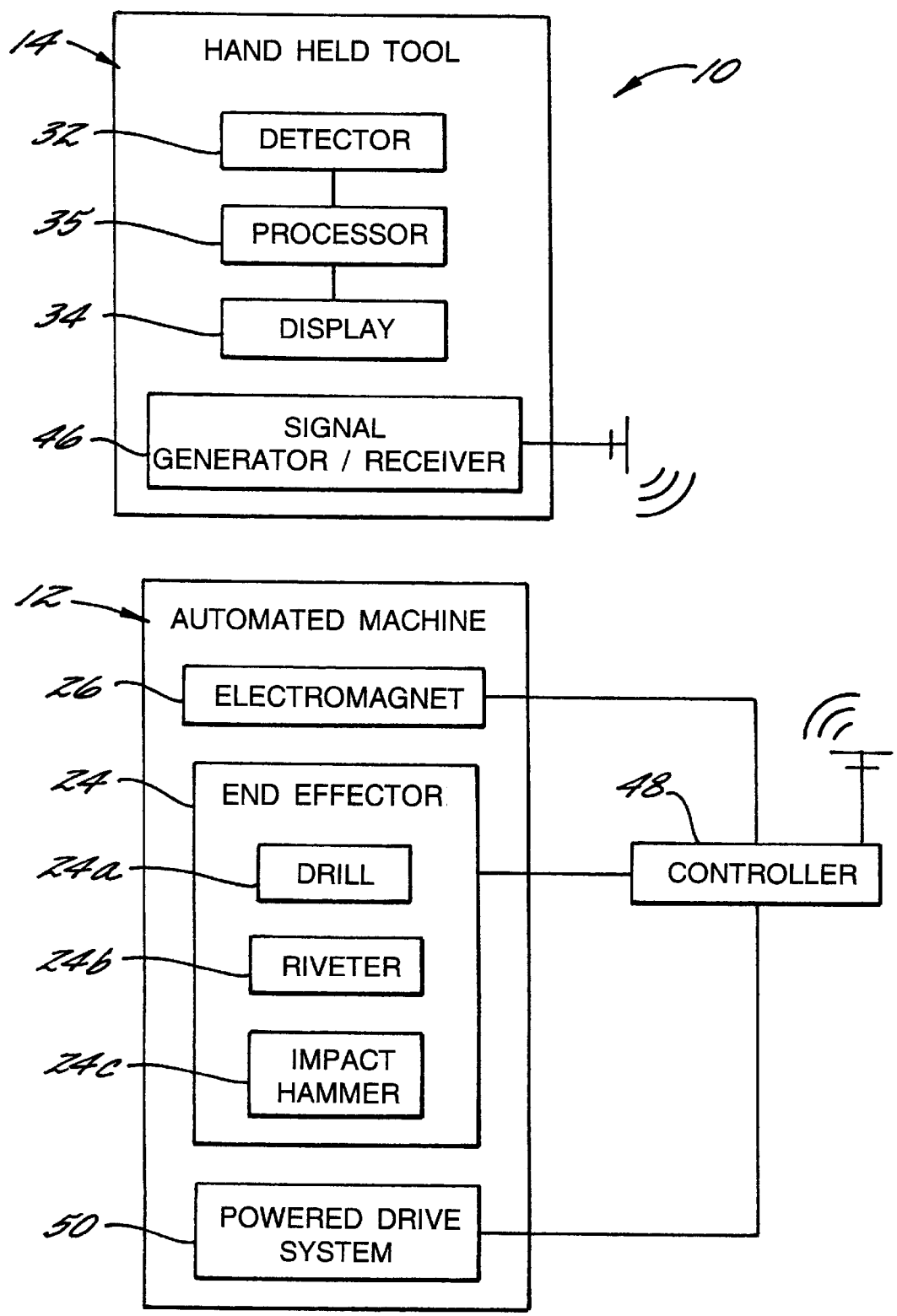
FIG. 4 is a diagrammatic depiction of the apparatus.

With reference to FIGS. 1–4, an apparatus 10 for installing fasteners in a workpiece in accordance with a preferred embodiment of the invention is shown. FIGS. 1 and 2 show the apparatus 10 in use in a fuselage barrel of an airframe structure, and FIG. 3 shows the apparatus in use on a wing box. FIG. 4 is a diagrammatic depiction of the apparatus 10. The apparatus 10 includes an automated machine 12 disposed on one side of the workpiece and a hand-held tool 14 disposed on the other side of the workpiece. The automated machine 12 is supported on a guide structure 16 that advantageously can be releasably attached to the workpiece. In the illustrated embodiment, the guide structure 16 comprises a pair of parallel guide rails 18 affixed to the surface of the workpiece by suction cups 20. The guide structure could instead be affixed to the workpiece by bolts or the like, or could be supported without being attached to the workpiece, as long as the guide structure is fixed relative to the workpiece. The automated machine 12 includes a platform or carriage 22 that rides along the rails 18. The carriage 22 supports an end effector 24 that is operable to perform operations on the workpiece such as drilling a hole through the workpiece and installing a fastener into the hole. The end effector advantageously includes a drill 24a, and a riveter 24b such as an electromagnetic riveter (EMR) or the like. The end effector may also include an impact hammer 24c or the like for forcing a lock bolt or similar type of fastener through a hole drilled through the workpiece. Any one of the various tools 24a–c of the end effector can be moved into a working position aligned with a target location on a workpiece where a fastener is to be installed, while the other tools are held in stand-by positions, and the selected tool can be operated to perform an operation on the workpiece. After this operation is complete, the selected tool can be moved into a stand-by position and another of the tools can be moved to a working position aligned with the target location. Such end effectors are known, and thus will not be further described herein.

Figure 5:
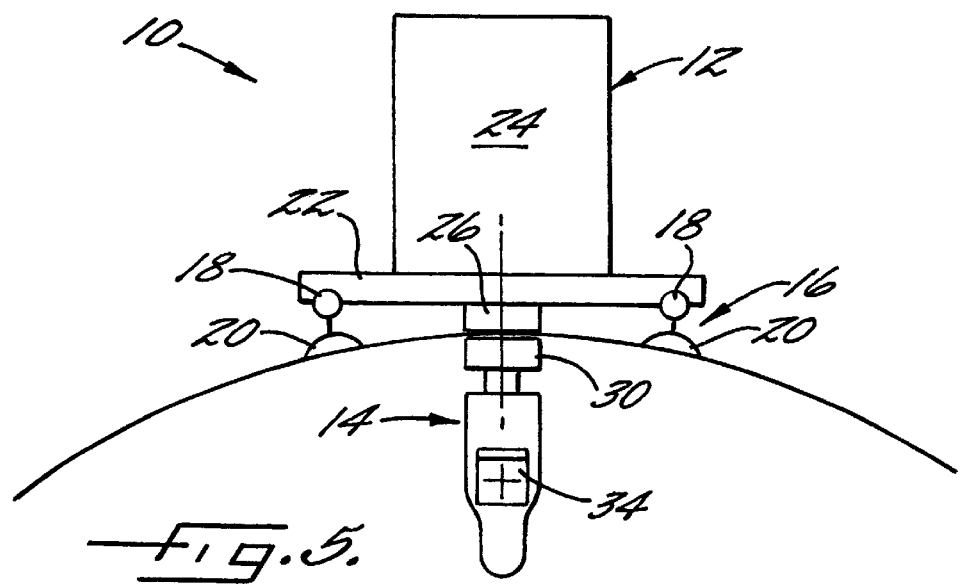
FIG. 5 is a schematic elevational depiction of the apparatus in position on opposite sides of a workpiece.
Figure 5A:
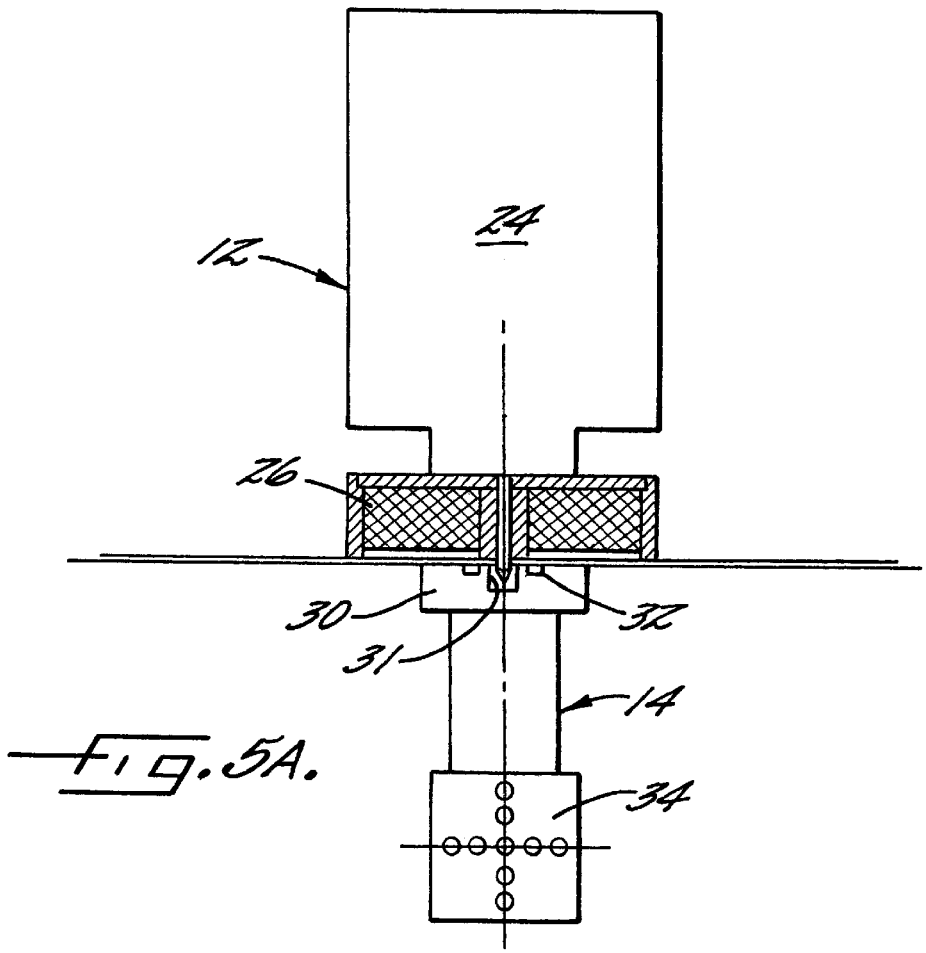
FIG. 5A is a view similar to FIG. 5, but partially cut away to show the electromagnet and clamping block and the positioning sensors in better detail.

The automated machine 12 also includes an electromagnet 26 disposed adjacent the end effector 24 and located so that it can be placed against the surface of the workpiece, as best seen in FIGS. 5 and 5A. The electromagnet 26 is operable to generate a magnetic field, and preferably is operable to generate either a relatively weak magnetic field that is used for positioning of the hand-held tool 14 or a relatively strong magnetic field that is used for clamping purposes, as further described below.

The hand-held tool 14 includes a magnetic clamping block 30, such as a block of steel or similar magnetic material. The clamping block 30 is located so that it can be placed against the surface of the workpiece on the side thereof opposite from the automated machine 12. Accordingly, when the electromagnet 26 generates a sufficiently strong magnetic field, the clamping block 30 is attracted to the electromagnet and the workpiece is clamped therebetween. As an example, the electromagnet 26 and clamping block 30 may clamp a flange of a stringer against a fuselage skin or wing skin so that a rivet can be installed to join the stringer to the skin, or a joint can be formed between two overlapping portions of two skins by clamping the overlapping portions between the electromagnet 26 and the clamping block 30 and installing a rivet to join the portions together.

In order to be able to drill a hole entirely through the workpiece, the drill bit of the end effector 24 must be able to exit through the surface against which the clamping block 30 is placed. To this end, the clamping block 30 preferably includes a hole or receptacle 31 (FIG. 5A) for receiving the end of the drill bit so that it can exit from the workpiece. For the clamping block 30 to function properly, this hole or receptacle must be aligned with the tooling of the end effector. Additionally, where the end effector 24 includes a riveter for installing a rivet into the hole drilled through the workpiece, the hand-held tool 14 may include an anvil (not shown) for upsetting the rivet, and this anvil must be aligned with the rivet. In order to align the hand-held tool 14 with the end effector, the hand-held tool includes a detector 32 that is operable to detect a relatively weak magnetic field generated by the electromagnet 26. This relatively weak magnetic field is insufficiently strong to attract the clamping block 30 with sufficient force to clamp the workpiece, and thus the worker is able to move the hand-held tool 14 along the surface of the workpiece while this magnetic field is present. The detector 32 is operable to generate guidance information telling the worker where to move the hand-held tool 14 to align it with the end effector 24, and more specifically with the electromagnet 26. The detector 32 may comprise, for example, a magnetic compass or a sensor that operates based on the Hall effect.

Figure 6:
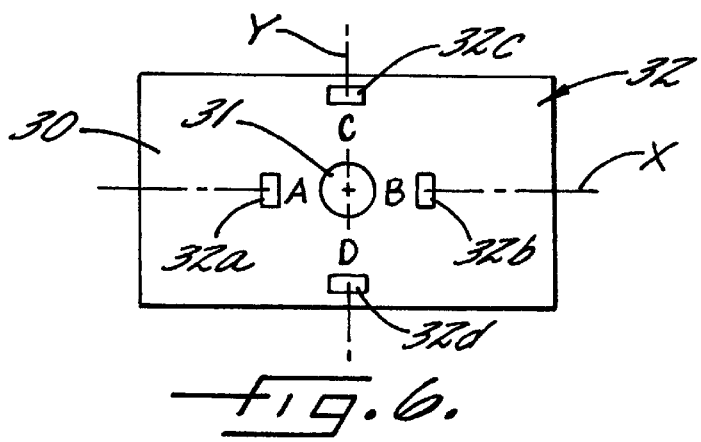
FIG. 6 is an end elevation of the hand-held tool, showing the clamping block with the positioning sensors arranged therein.

Advantageously, the detector 32 comprises an array of Hall effect sensors 32a–32d as shown in FIG. 6, which is an end view of the clamping block 30. The Hall effect sensors 32a–32d are embedded in the surface of the clamping block 30 and are arranged in a square array symmetrically about the receptacle 31 into which the end effector drill passes when drilling a hole through the workpiece. Thus, the sensors 32a and 32b are aligned along a first axis X that passes through the center of the receptacle 31 and are equally spaced from the receptacle 31 on opposite sides thereof. Similarly, the sensors 32c and 32d are aligned along a second axis Y that passes through the center of the receptacle 31 and is perpendicular to the X-axis, and are equally spaced from the receptacle on opposite sides thereof. The Hall effect sensors 32a–32d detect small variations in flux density of a magnetic field in which they are placed. The sensors convert the magnetic flux density into a DC output voltage. Thus, when the array of sensors 32a–32d is placed in a magnetic field whose flux density is spatially non-uniform, in general the output voltages from the various sensors will be different from one another. These output voltages can be used for determining a relative positioning of the sensors with respect to the magnetic field.

Figure 7:
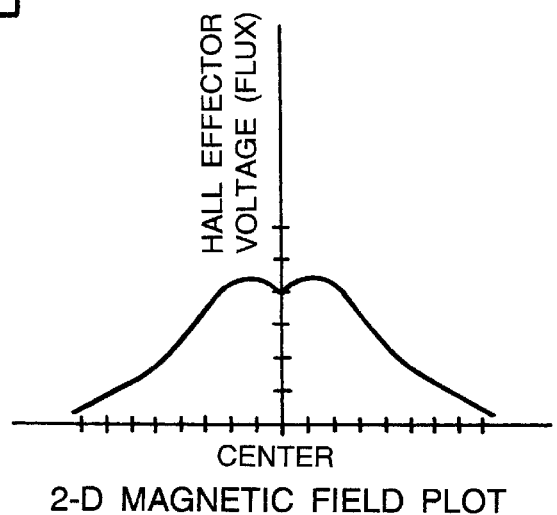
FIG. 7 is a schematic plot representing a spatial distribution of magnetic flux produced by the electromagnet.

More particularly, the electromagnet 26 is advantageously operable to generate a magnetic field that is symmetric along all axes that are perpendicular to the center axis of the electromagnet (i.e., the axis along which the end effector tools are aligned in use). FIG. 7 is a schematic plot representing a spatial distribution of magnetic flux produced by the electromagnet 26 along one such perpendicular axis; the distribution has a similar symmetry along any other axis perpendicular to the center axis. The horizontal axis represents distance away from the center axis, and the vertical axis represents magnetic flux density (or, equivalently, DC output voltage of a Hall effect sensor immersed in the magnetic field). It will be noted that the flux density is generally greatest at the center axis, and falls off with distance away from the center axis.

FIGS. 8A through 8C show how the sensor array can be used for aligning the center of the sensor array (and thus the center of the receptacle 31) with the center axis of the electromagnet, which corresponds to the location of the peak of the magnetic flux density distribution. FIG. 8A shows a situation in which the sensors 32a and 32b are displaced toward the right relative to the center axis of the electromagnet 26 such that the sensor 32a is located in a relatively stronger flux-density region of the magnetic field, and the sensor 32b is located in a relatively weaker flux-density region of the field. Accordingly, the voltage output $V_A$ from the sensor 32a will exceed the voltage output $V_B$ from the sensor 32b. Conversely, in FIG. 8B, the sensors are displaced toward the left such that the output voltage $V_A$ is less than the output voltage $V_B$. FIG. 8C shows the situation in which the sensors 32a and 32b are equally spaced on opposite sides of the center axis of the magnetic field, and thus (because the field is symmetric) the output voltages $V_A$ and $V_B$ are equal. It should thus be apparent that the relative output voltages of the sensors 32a and 32b can be used as an indication of how much and in which direction the sensors are misaligned relative to the center axis of the electromagnet. For example, if $V_A$ is much greater than $V_B$, it can be inferred that the misalignment is toward the right and is relatively great; if $V_A$ is only slightly greater than $V_B$, it can be inferred that the misalignment is toward the right and is relatively small; and so forth. Of course, it will be understood that the sensors 32a and 32b are used for detecting misalignment in the X-axis direction, and that the sensors 32c and 32d can be used in the same way for detecting misalignment in the Y-axis direction. Accordingly, the center axis of the clamping block receptacle 31 can be precisely aligned with the center axis of the electromagnet and end effector tooling.

Preferably, the hand-held tool 14 includes a visual display 34 for graphically displaying the guidance information generated by the detector 32. A processor 35 receives the signals generated by the detector 32 and processes the signals to determine directional information indicating in which direction the electromagnet 26 is located relative to the clamping block 30 and the proximity of the clamping block to the electromagnet. The processor 35 creates signals that are usable by the visual display 34 so that directional and proximity information are graphically displayed. The display 34 may comprise a liquid crystal display or a light-emitting diode display.

Figure 10:
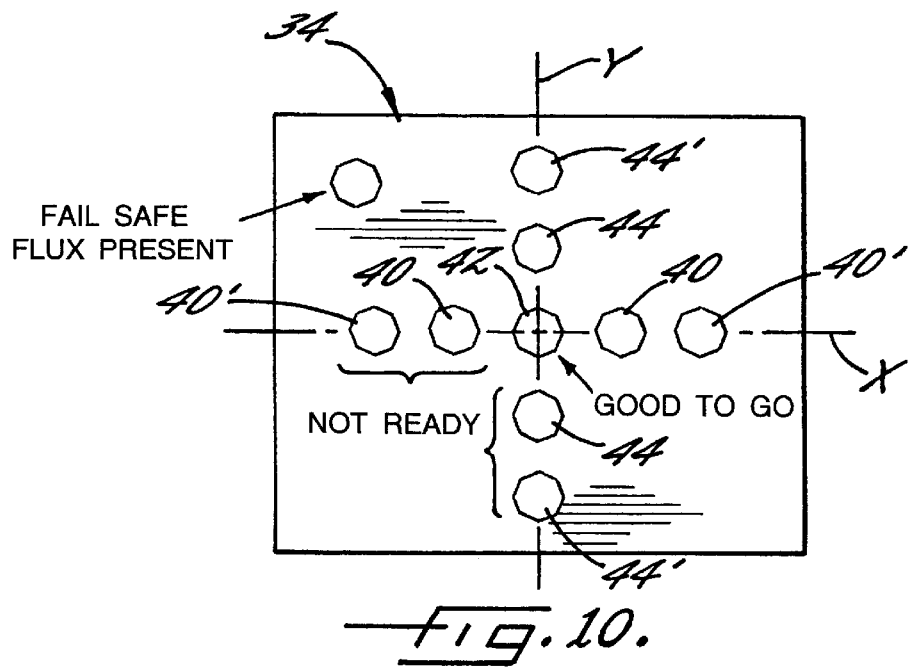
FIG. 10 is a depiction of a visual display in accordance with one preferred embodiment of the invention for guiding the operator in aligning the hand-held tool.
Figure 9:
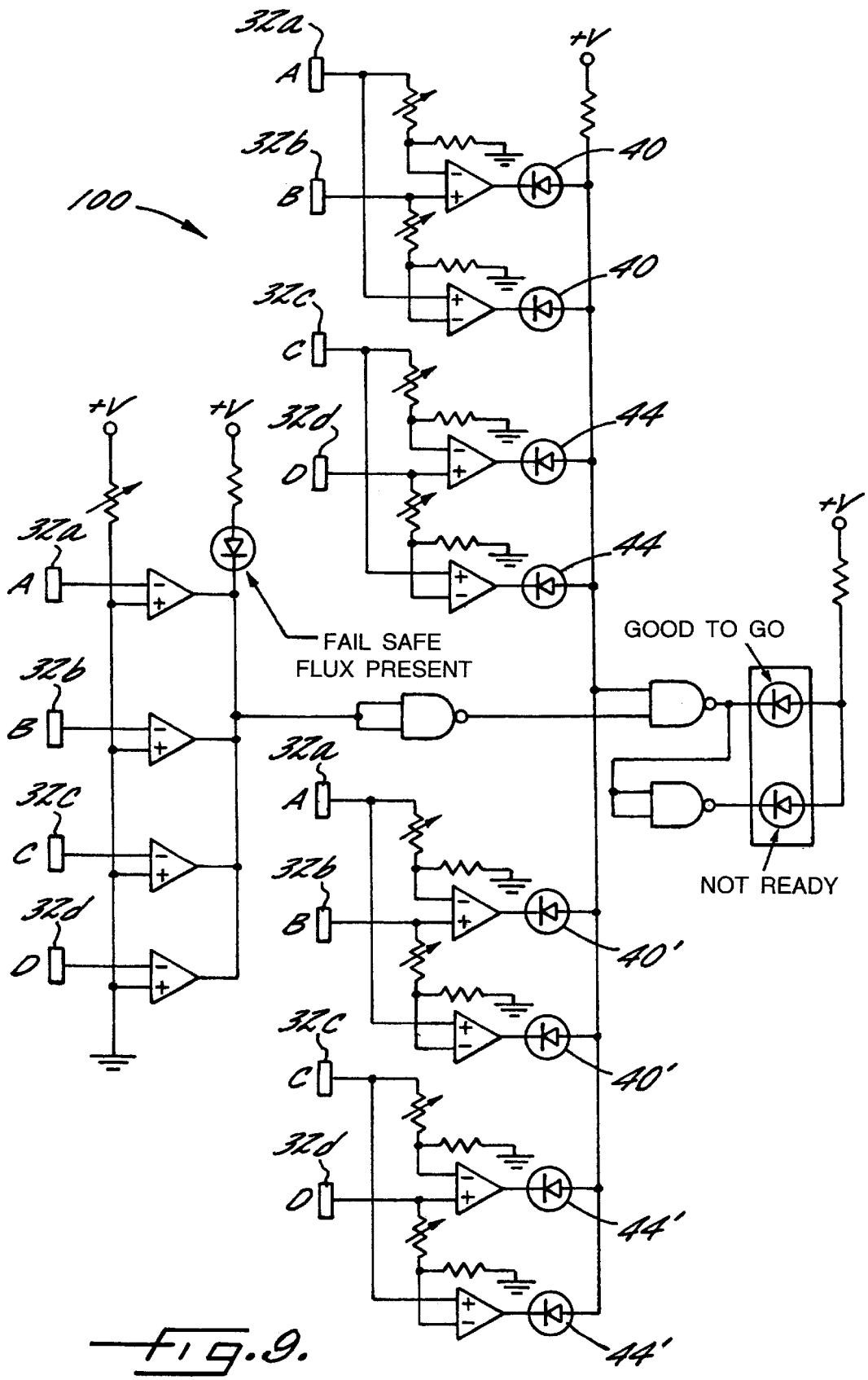
FIG. 9 is a circuit diagram showing the positioning sensor circuit used with the positioning sensors for illuminating LED indicators on the hand-held tool to guide an operator in moving the tool into alignment with the end effector and electromagnet.

The processor 35, when the detector 32 comprises the square array of Hall effect sensors 32a–32d as described above, advantageously includes a circuit 100 as depicted in FIG. 9 for processing the voltage output signals from the sensors and for illuminating various LEDs of a visual display 34, such as the display shown in FIG. 10, based on relative magnitudes of the voltage signals.

A number of alternative visual displays 34 are depicted in FIGS. 11A through 11F. It is advantageous for the display 34 to operate in two different modes, one providing a coarse-tuning function for guiding the worker to roughly align the hand-held tool with the electromagnet 26, for example within about plus or minus 3 inches, and the other mode providing a fine-tuning function for guiding the worker to more precisely align the hand-held tool with the electromagnet, for example within about plus or minus 0.1 inch. Two separate displays may be used for the coarse-tuning and fine-tuning modes, or a single display may be used for alternately displaying coarse-tuning and fine-tuning guidance information.

Figure 11A:
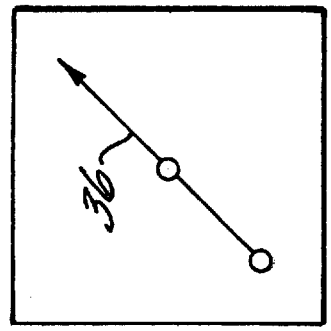
FIGS. 11A through 11F depict various alternative embodiments of visual displays for guiding the operator in aligning the hand-held tool.
Figure 11B:
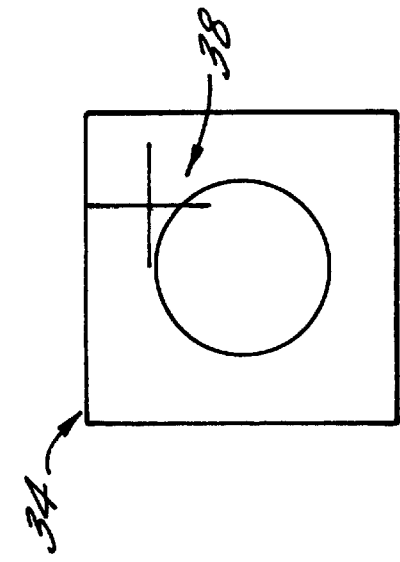
Figure 11C:
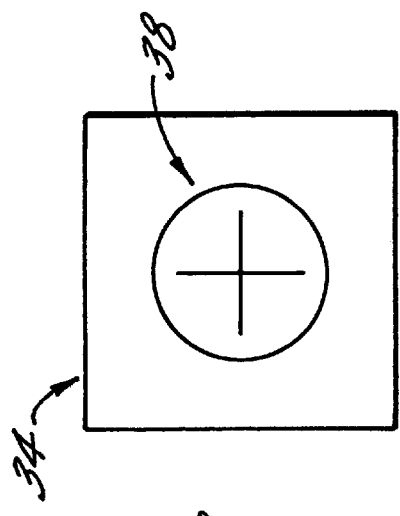
Figure 11D:
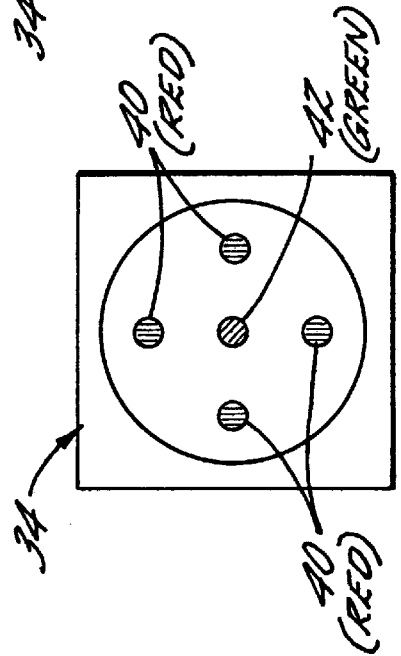
Figure 11E:
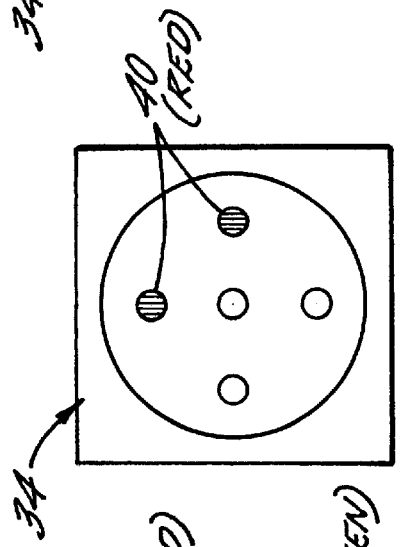
Figure 11F:
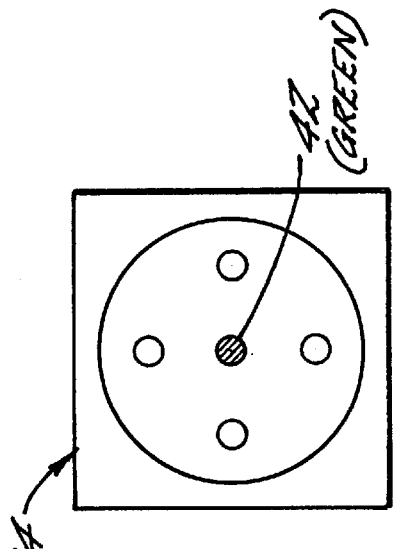

FIG. 11A depicts a visual display 34 operating in a coarse-tuning mode. The display includes indicia 36 indicating in which direction the hand-held tool should be moved to bring it into closer alignment with the electromagnet 26. As shown, the indicia 36 may be an arrow or other directional indication. FIGS. 11B through 11F depict various visual displays operating in fine-tuning modes. In the display shown in FIGS. 11B and 11C, indicia 38 including a circle and a cross-hair are used for respectively indicating the relative positions of the electromagnet 26 and the hand-held tool 14; the hand-held too is properly aligned when the cross-hair is centered in the circle, as shown in FIG. 1C. FIGS. 11D through 11F depict another type of visual display employing an array of differently colored LEDs. Four red LEDs 40 are located in a square array at the four corners of the square, and a green LED 42 is located at the center of the square. If one of the red LEDs is illuminated while the other LEDs are not, the worker moves the hand-held tool in the direction defined by a line passing from the center green LED 42 through the illuminated red LED 40. If two adjacent red LEDs 40 are illuminated as shown in FIG. 11E, the worker moves the hand-held tool in a direction defined by a line passing from the center green LED 42 through a point midway between the two illuminated red LEDs 40. When the hand-held tool is aligned with the electromagnet 26 within a predetermined tolerance, the green LED 42 is illuminated and the red LEDs 40 are not, as shown in FIG. 11F.

The display 34 shown in FIG. 10 is a variation on that of FIGS. 11D–F, and includes four red LEDs along each of the X and Y axes. Along the X axis, there are two red LEDs 40 and 40' on either side of the center green LED 42. The red LEDs 40' spaced farther from the center green LED 42 are illuminated when there is a relatively greater degree of misalignment between the center of the hand-held tool and the central axis of the electromagnet along the X-axis direction, whereas the red LEDs 40 closer to the center green LED 42 are illuminated when there is a relatively smaller misalignment. Similarly, there are two red LEDs 44 and 44' on either side of the center green LED 42 along the Y axis, which operate in a similar manner to indicate relatively degrees of misalignment along the Y-axis direction.

Preferably, the hand-held tool 14 includes a command signal generator 46 (FIG. 4) that can be activated by the worker, such as by pulling a trigger or operating a similar type of switch device. The command signal generator 46 generates a command signal that is received by the automated machine, and more specifically by a controller 48 associated with the automated machine. For example, the command signal generator 46 may transmit an RF signal, and the controller 48 may include a receiver for receiving the RF signal. The command signal generator 46 is activated by the worker once the hand-held tool 14 has been properly aligned with the electromagnet 26 of the automated machine. If desired, the signal generator 46 may continuously generate the command signal as long as the worker pulls the trigger or operates the switch device on the tool. Upon receipt of the command signal, the controller 48 activates the electromagnet 26 to generate a magnetic field for clamping the workpiece between the electromagnet and the clamping block 30. Next, the controller 48 activates the end effector 24 to drill a hole through the workpiece, and then to install a rivet or other fastener through the hole. When the fastener installation is completed, the controller 48 can signal the worker to deactivate the electromagnet 26 so that the automated machine 12 can be moved along the rails 18 to the next location at which a fastener is to be installed. For example, the signal generator 46 may also comprise a receiver, and the controller 48 can transmit an RF signal that is received by the signal generator/receiver 46, which can initiate an audible alert and/or illuminate an LED or the like, telling the worker that the installation of the fastener has been completed. The worker can then deactivate the electromagnet 26, for example by releasing the trigger or operating the switch device so that the command signal that signals the controller to activate the electromagnet is discontinued. Alternatively, the controller 48 can automatically deactivate the electromagnet upon completion of a fastener installation, with or without an audible or visible alert to the worker.

Upon deactivation of the electromagnet 26, the automated machine 12 is moved to a new location of the workpiece at which another fastener is to be installed. The automated machine 12 preferably includes a powered drive device 50 (FIG. 4) for moving the machine along the rails 18 to the new location. The powered drive device 50 advantageously is controlled by the controller 48 so as to accurately position the machine 12 in a predetermined location along the workpiece. For example, the controller 48 may comprise a computer numerical control (CNC) device. The controller 48 preferably stores a predetermined series of coordinates defining the locations at which fasteners are to be installed, and moves the machine 12 to each of these locations in a sequential fashion, stopping at each location so that the end effector 24 can drill a hole and install a fastener as previously described. The design of a suitable drive system and controller for moving the automated machine 12 is well within the capabilities of a machine designer of ordinary skill in the art of automated machine design.

Many modifications and other embodiments of the invention will come to mind to one skilled in the art to which this invention pertains having the benefit of the teachings presented in the foregoing descriptions and the associated drawings. For example, while the invention has been described as advantageously including an automated machine 12 that is moved in an automated (e.g., numerically controlled) fashion along one side of a workpiece, in some applications it may be desirable to employ a machine that is moved in a non-automated fashion but yet includes the electromagnetic clamping device and the above-described features for generating a positioning signal, and also includes at least one tool such as a drill or riveter. As an example, it may be desirable for a worker to manually position the machine, while a second worker operates the hand-held tool 14 on the other side of the workpiece. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for installing a fastener in a workpiece, comprising disposing a drilling and fastener installation machine adjacent a first surface of the workpiece such that an electromagnetic clamping device of the machine is against the first surface;

placing a hand-held tool adjacent an opposite second surface of the workpiece such that a magnetic clamping block of the tool is against the second surface;

sending a positioning signal from the drilling and fastener installation machine to the hand-held tool;

detecting the positioning signal at the hand-held tool;

aligning the hand-held tool with the electromagnetic clamping device based on the detected positioning signal;

activating the electromagnetic clamping device after the hand-held tool has been aligned, so as to cause the magnetic clamping block and the electromagnetic clamping device to be attracted toward each other and clamp the workpiece therebetween; and operating the drilling and fastener installation machine to drill a hole through the workpiece and install a fastener into the hole.

2. The method of claim 1, wherein sending the positioning signal comprises activating the electromagnetic clamping device to generate a magnetic field of insufficient strength to cause clamping of the workpiece.

3. The method of claim 2, wherein detecting the positioning signal comprises using a sensor disposed on the hand-held tool to sense the magnetic field.

4. The method of claim 3, wherein the sensor generates guidance information intelligible by a human operator informing the operator where to move the hand-held tool so as to align the tool with the electromagnetic clamping device.

5. The method of claim 4, further comprising visually displaying the guidance information so that it can be viewed by the operator.

6. The method of claim 1, wherein the activation of the electromagnetic clamping device is accomplished by sending a command signal from the hand-held tool, receiving the command signal at the drilling and fastener installation machine, and activating the electromagnetic clamping device in response to the command signal.

7. The method of claim 1, further comprising sending a signal from the drilling and fastener installation machine to the hand-held tool indicating that a fastener installation has been completed.

8. TIhe method of claim 7 further comprising deactivating the electromagnetic clamping device in response to the signal sent from the drilling and fastener installation machine to the hand-held tool.

9. The method of claim 1, further comprising supporting the drilling acid fastener installation machine on a guide structure extending along the first surface of the workpiece, and moving the machine along the guide structure to position the machine at a location where a fastener is to be installed.

10. The method of claim 9, wherein the machine is moved along the guide structure by a powered drive system.

* * * * *

UNITED STATES PATENT AND TRADEMARK OFFICE
CERTIFICATE OF CORRECTION

PATENT NO. : 6,357,101 B1
DATED : March 19, 2002
INVENTOR(S) : Sarh et al.

It is certified that error appears in the above-identified patent and that said Letters Patent is hereby corrected as shown below:

<u>Column 8,</u>
Line 51, after "comprising" insert a colon (:).

<u>Column 10,</u>
Line 9, "Tlhe" should read -- The --;
Line 14, "acid" should read -- and --.

Signed and Sealed this

Twenty-fourth Day of September, 2002

Attest:

JAMES E. ROGAN
Attesting Officer  *Director of the United States Patent and Trademark Office*

UNITED STATES PATENT AND TRADEMARK OFFICE
CERTIFICATE OF CORRECTION

PATENT NO.    : 6,357,101 B1
DATED         : March 19, 2002
INVENTOR(S)   : Sarh et al.

It is certified that error appears in the above-identified patent and that said Letters Patent is hereby corrected as shown below:

<u>Column 8,</u>
Line 51, after "comprising" insert a colon (:).

<u>Column 10,</u>
Line 9, "Tlhe" should read -- The --;
Line 14, "acid" should read -- and --.

Signed and Sealed this

Fifteenth Day of October, 2002

*Attest:*

JAMES E. ROGAN
*Attesting Officer*   *Director of the United States Patent and Trademark Office*